United States Patent
Zacarias et al.

(10) Patent No.: US 6,783,585 B2
(45) Date of Patent: Aug. 31, 2004

(54) CARBON REMOVAL THROUGH PARTIAL CARBON BURN-OUT FROM COAL ASH USED IN CONCRETE

(75) Inventors: Philip Souza Zacarias, Mississauga (CA); David Bridson Oates, Kettleby (CA)

(73) Assignee: Lafarge Canada Inc., Quebec (CA)

( * ) Notice: Subject to any disclaimer, the term of this patent is extended or adjusted under 35 U.S.C. 154(b) by 2 days.

(21) Appl. No.: 10/272,671

(22) Filed: Oct. 15, 2002

(65) Prior Publication Data

US 2004/0069186 A1 Apr. 15, 2004

(51) Int. Cl.$^7$ .......................... C04B 18/04; C04B 18/06
(52) U.S. Cl. .................. 106/405; 106/705; 106/DIG. 1
(58) Field of Search ............................... 106/405, 705, 106/DIG. 1

(56) References Cited

U.S. PATENT DOCUMENTS 5,160,539 A * 11/1992 Cochran ..................... 106/405
5,399,194 A    3/1995 Cochran et al.
6,457,425 B1 * 10/2002 Crafton et al. .............. 110/346
6,521,037 B1 *  2/2003 Hurt et al. .................. 106/405

* cited by examiner

Primary Examiner—C. Melissa Koslow
Assistant Examiner—Shalie Manlove
(74) Attorney, Agent, or Firm—Bachman & LaPointe, P.C.

(57) ABSTRACT

Concrete's durability to freeze-thaw cycles is dependent on its level of air entrainment, the appropriate level of which is achieved with the aid of surface active or air entraining agents. These agents promote the fragmentation of large air voids into smaller ones and stabilize air voids in the concrete. The carbon matter found in fly ash when used as a pozzolanic component of concrete, adsorbs the air entraining agents, reduces the air voids and concrete's ability to withstand many freeze-thaw cycles. This invention teaches a process for a partial removal of the carbon from the coal ash, used in concrete, through a partial combustion of only a fine carbon fraction of the carbon residue of the coal ash responsible for adsorbing the air entraining agents, in a reactor with a controlled ignition system. The process of the invention thus limits the adsorption of the air entraining agents and improves the freeze-thaw properties of the concrete produced.

35 Claims, No Drawings

CARBON REMOVAL THROUGH PARTIAL CARBON BURN-OUT FROM COAL ASH USED IN CONCRETE

BACKGROUND OF THE INVENTION

1. Field of the Invention

The invention relates to the process and the products obtained by a partial removal of carbon from coal ash which is used in the production of concrete. The carbon removed, through a thermal process of Partial Carbon Burn-Out (PCBO) can no longer reduce the activity of air entraining agents, which increase the stability, the number and the size of air voids in the concrete. The presence of appropriate air voids improves the freeze-thaw resistance of concrete.

2. Description of the Prior Art

Concrete consists of a cement binder, a pozzolanic material such as fly ash which will react with a mineral alkali, an aggregate material and sufficient water to cause the cement to set and bind the components into a hardened and durable material. A pozzolanic material reacts with calcium hydroxide, a by-product of Portland cement hydration to form compounds having the cementitious properties.

Unburned carbon in fly ash has a broad particle size distribution ranging from coarse char (>75 $\mu$m) to very fine soot sized (=40 nm) amorphous carbon particles that has a very high surface area (Gao, Y. M., H. S. Shim, R. H. Hurt, E. M. Suuberg, N. Yang, "Effects of Carbon on Air Entrainment in Fly Ash Concrete: Role of Soot and Carbon Black", Energy & Fuels 11, 457, 1997). The very fine unburned carbon in fly ash has properties similar to that of activated carbon and as such has an affinity for molecules that have hydrophobic moieties, such as air entraining agents.

The durability of concrete to freeze-thaw cycles is dependent on its level of air entrainment. When water freezes its volume increases 9%. If concrete is fully saturated, all air voids are filled with water, the tensile stresses generated by the freezing water are sufficient to cause cracking and deterioration. Concrete has excellent strength in compression but its tensile strength is approximately 7%–10% of the compressive strength. When concrete begins to freeze the expanding ice forces water into the unfrozen regions of the cement binder—this movement of water creates large hydraulic pressures and generates tensile stress.

Many factors affect the durability of concrete to cycles of freezing and thawing: the cement binder content; amount and type of pozzolan; water to cement ratio; quality of the aggregates; and, the presence of air voids with an optimum spacing and size distribution.

Air is naturally entrapped in concrete through the folding and shearing action of mixing the cement paste. The entrapped air voids are large and not stable in concrete unless air entraining agents are used. Air entraining agents are surface active agents or surfactants. These agents reduce the surface tension of water, which tends to promote the fragmentation of large air voids into smaller ones, and to stabilize air voids by collecting at the water interface and forming a film.

The unburned carbon residue present in fly ash has a high adsorptive capacity for air entraining agents. The time dependent adsorption of air entraining agents causes a loss of entrained air during mixing and placement, and ultimately affects durability of the concrete by degrading the air void system.

LOI (Loss On Ignition) is a measure of the residual combustible material, primarily carbon in the coal ashes. There are several processes in commercial use that aim to reduce the LOI of moderate to high LOI fly ashes significantly to a level below 3% by weight. These include methods employing electrostatic separation or by carbon combustion. It should be noted that carbon makes up most of the measured LOI (to within about 10%) but more particularly it is the adsorption capacity of fly ash for air entraining agents and not the LOI, that is the ultimate criteria for whether the fly ash is commercially useful.

U.S. Pat. No. 5,399,194 describes a thermal treatment for fly ash in a fluid bed between 800 and 1300° F., or (426 and 700° C.) while U.S. Pat. No. 5,160,539 describes the use of a fluid bed to reduce the LOI in a temperature range from 1300 to 1800° F. or 700 to 982° C. and is clearly designed to eliminate as much carbon as possible.

SUMMARY OF THE INVENTION

One object of the invention is to provide a process for producing a coal ash having a low adsorption affinity for air entraining agents in concrete. This process comprising a partial combustion of a carbon residue of the feed coal ash wherein a fine carbon fraction of said carbon residue that is responsible for adsorption of air entraining agents in concrete is combusted, while leaving a non-combusted carbon fraction with a lower adsorption capacity for air entraining agents; and a recovery of the coal ash product.

It is another object of this invention to provide a method for inhibiting adsorption characteristics of coal ash bearing a carbon residue. The method comprising combusting an adsorbing fraction of said carbon residue responsible for adsorption of air entraining agents in concrete, while leaving non-adsorbing carbon of said carbon residue un-combusted in said coal ash.

Another object of the invention is a coal ash product which has low levels of a fine carbon fraction responsible for adsorbing air entraining agents in concrete. The fly ash product for use in concrete, is produced by a partial combustion of a carbon residue of a feed coal ash wherein the fine carbon fraction of said carbon residue responsible for adsorption of air entraining agents in concrete is combusted, while leaving a non-combusted carbon fraction of non-air entrainment agent absorbing carbon in the coal ash product.

Yet another object of the invention is a concrete product. The concrete product having a cement binder, an aggregate, and an air entraining agent characterized in that it includes, a coal ash product which has low levels of a fine carbon fraction responsible for adsorbing air entraining agents in concrete produced by, a partial combustion of a carbon residue of a coal ash wherein the fine carbon fraction of said carbon residue responsible for adsorption of air entraining agents in concrete is combusted, while leaving a non-combusted carbon fraction of non-air entrainment agent absorbing carbon in the coal ash product, which are all mixed together with water to produce said concrete product.

DETAILED DESCRIPTION OF THE PREFERRED EMBODIMENT

When concrete contains sufficient cement (>225 kg/m$^3$) and the water to cement ratio is less than 0.55:1, the concrete will be durable providing that an air entraining agent is used to generate an air void system consisting of very fine bubbles (50 to 200 $\mu$m). The average distance from any point in the cement paste or the spacing factor, must not be more than 200 $\mu$m from the nearest air void in order to protect the cement paste. The air voids in air entrained concrete relieve the pressure (i.e. tensile stresses) by accommodating the hydraulic pressure produced by the expansion of water at lower temperatures and prevent damage to the concrete. Air entrained concrete that has adequate strength and is appropriately saturated with air will withstand hundreds of freezing and thawing cycles without dilating or losing strength.

Air entraining agents promote the adhesion of air voids to the surface of hydrating cement grains which further stabilizes the air void in the cement paste. In general, as the dosage of the air entraining agent increases, the air content increases up to a maximum value, after which additional increases in air entraining agent do not increase air content significantly. The dosage rate of air entraining agent required to achieve a target air content is dependent on the type of air entraining agent, concrete temperature, concrete materials, such as sand, cement, fly ash, and mixture proportions.

The adsorption of air entraining agents by the carbon contained in coal ashes, reduces their concentration in solution, which in turn causes the destabilization of air voids. Under such conditions air voids coalesce into larger voids, with some rising to the surface and being lost. The remaining fewer and coarser air voids are much less effective in protecting the concrete because of their low surface area.

Regardless of the actual mechanism of air entrainment, a certain concentration of air entraining agent is required to achieve an air content of 5% to 8% in concrete. Normal cement hydration absorbs a portion of the air entraining agent, which causes the air content of the concrete to decline with time.

There are various air entraining agents available and may contain a metal cation and an non-polar organic group. Typical air entraining agents include: neutralized Vinsol resin, sodium abietate, sodium oleate and sodium dodecylbenzene sulfonate.

The ASTM C618-01, test method for the "Standard Specification for Coal Fly Ash and Raw or Calcined Natural Pozzolan for Use as a Mineral Admixture in Concrete", stipulates for both Class C and Class F fly ashes a maximum Loss-On-Ignition (LOI) of 6%. Experience has shown that with certain fly ashes, the entrainment and maintenance of an air void system is difficult and in some cases impossible, despite meeting the requirements of ASTM C618-01. Though Class C fly ashes have much less unburned carbon than Class F fly ashes they can also have difficulties entraining and maintaining an air void system. Class C fly ash is typically produced from lignite and sub-bituminous coal and contain higher quantities of lime (CaO), which in addition to having pozzolanic properties gives Class C fly ash cementitious properties as well. Class F fly ash is produced from the combustion of bituminous and anthracite coals, with far lower lime levels and little to no cementitious properties.

Unburned carbon in fly ash is either amorphous or crystalline, and the relative amounts of the two depend on the coal and combustion conditions in the boiler. Both types of carbon absorb air entraining agents but the amorphous carbon portion of the fly ash absorbs the air entraining agents, at a higher rate, dramatically reducing their concentration in solution. The very fine carbon in the ash has a high surface area and behaves like activated carbon and is responsible for adsorbing the air entraining agents. Coarse carbon has a lower surface area and adsorbs less of the air entraining agents.

The amorphous carbon has a higher surface area and is more polar relative to crystalline carbon (R. Hill, S. Sarkar, R. Rathbone, J Hower, Cement Concrete Research, Vol.27 (2),pp 193–204, 1997). The fraction of amorphous carbon in fly ashes varies from source to source, and can vary within the same source. The ASTM C618-01 Loss-On-Ignition method does not provide information on the amount of amorphous carbon in fly ash and therefore alternative methods, such as the ASTM C311 mortar method or foam index are required to determine the air entraining agent adsorbing affinity of the fly ash. The method proposed here is a modified foam index method.

The foam index method was originally developed by Dodson and further modified by Menninger (R. Helmuth, "Fly Ash in Cement and Concrete", Portland Cement Association, 1987, pp 80–81). The original method consists of adding 50 ml of water to 16 grams of Portland cement and 4 grams of fly ash (Class F) in a 125 ml glass jar. The mixture is shaken vigorously for 1 minute and then a diluted air entraining agent, such as neutralized Vinsol resin, is added drop-wise, in increments of 1 to 5 drops. After each addition of air entraining agent solution, the jar is shaken vigorously for 15 seconds. The foam layer is observed for stability over a period of 45 seconds and if no significant collapse of the foam occurs then the number of drops of air entraining agent solution used is the foam index value. The foam index value corresponds approximately to the apparent saturation point where most of the active adsorption sites on the fly ash carbon are covered with air entraining agent molecules. If the slurry is left to stand and shaken again the foam stability will decrease with time, indicating that equilibrium has not been reached. Therefore, it is important to obtain the foam index value at approximately the same time and to limit the amount of time allowed for the determination.

For the purposes of the invention the foam method has been modified and consists of the following steps: 5 grams of fly ash is added to 70 ml. of distilled water containing 0.3 ml. 25% sodium citrate solution; the suspension is titrated with a solution of 0.2% sodium lauryl sulfate (SLS) solution until a stable foam layer is obtained after shaking vigorously 20 times after each incremental addition of sodium lauryl sulfate solution; the volume of the titrated solution is the value taken for the foam index. A foam index value of 0.8 ml was found to be the average value for commercially saleable Class F fly ash and the target for Partial Carbon Burn-Out.

The modified foam index method was developed for use with Class F fly ash which has an LOI between 2% and 5%. ASTM C618-01 limits the LOI value to a maximum of 6% (12% if concrete data is available showing that air can be entrained and that this level has been accepted by the user), but in many cases it is difficult to achieve and maintain the specified air contents in concrete containing Class F fly ash that has an LOI greater than 3%. Class C fly ash has an LOI in the range of 0.1 to 1.5%+ and ordinarily do not exhibit problems with air entrainment. Nevertheless, significant changes in air entrainment and stability problems are occasionally experienced with many Class C fly ashes. The usual indicators of fly ash quality, such as color and LOI, do not provide sufficient information on the quality of Class C fly ashes. The foam index method, on the other hand, can detect such changes where the fly ash is not noticeably darker, the LOI is normal, but the foam index indicates a high adsorption capacity. The thermal treatment of this invention does not substantially change the color of the fly ash product.

EXAMPLE 1

Baseline values of foam index for raw fly ash samples from Hatfield, Fort Martin and Wateree are given in Table 1.

TABLE 1

Typical Foam Index Values for Marketable Fly Ash

| Source - Date Code | Carbon Content, % | Modified Foam Index 0.2% SLS, mls |
|---|---|---|
| HFX00308 |  | 0.8 |
| HFX91230 | 1.11 | 0.9–1.0 |
| HFX91215 | 1.96 | 0.9 |
| HFX91206-1 | 1.41 | 0.7 |
| HFX91122 | 1.26 | 0.6 |
| FMX91216 | 1.98 | 0.9 |
| FMX00216 | .83 | 0.6 |
| FMX91207 | 1.73 | 0.7 |
| Wateree | 2.78 | 0.6–0.7 |

Notes:
5 ml used samples with the modified foam method described. HF and FM designate Hatfield and Fort Martin, respectively SLS = sodium lauryl sulfate The fly ashes from Lakeview Power Plant in Ontario and Fort Martin in West Virginia, were considered and compared. Typically, fly ash has a particle size distribution such that approximately 75% of the mineral fraction is minus 45 µm, 45–50% is less than 20 µm, and about 25% is below 10 µm. Fly ashes from different sources are reasonably similar with some variations from source to source and as a function of how fine the coal was ground and the combustion process used.

The Lakeview and Fort Martin fly ashes show a total measured carbon content, with 5 and 10% of the carbon less than 10 µm and 20–25% minus 20 µm and 50% of the carbon is less than 45 µm.

With the surface area inversely proportional to diameter of the particle this in effect means that a greater percentage of surface area resides in the fine carbon fraction, this important property is linked to this invention.

The Partial Carbon Burn-Out trials were conducted using a pilot scale fluidized bed reactor and the fly ash from Pleasants W.Va. Initially, the fluidized bed reactor was operated at a temperature range of between 750 and 850° C. to determine the optimum operating temperature. The temperature obtained were measured immediately above the fluidized bed.

According to the results obtained in this program, thermal processing through the process of Partial Carbon Burn-Out (PCBO) with a pilot scale circulating fluid bed reactor was examined. PCBO was effective in reducing the adsorption capacity of the carbon in the fly ash. The fly ash product recovered after the partial carbon burn-out, experienced only an incomplete or interrupted combustion, as it still contained the majority of original carbon residue. This interruption is a distinct feature of the invention. The adsorption capacity of the carbon for air entraining agents was reduced by 55 to 70% in the temperature range of 700 to 850° C. This is an 11% reduction of LOI, from 4.05% to 3.58%.

Although the PCBO process of this invention was conducted in a compact circulating fluidized bed reactor, other solid and gas contactors can be foreseen. The solid and gas contactor may include specialized fluidized bed features alone or in combination that include circulation, classification and separation of solids, and with a bed such as a pacted bed, an expanded bed, a catalytic bed, a fixed bed alone and in combination.

The reduction in the adsorptive capacity of the carbon for air entraining agents is due to the destruction of the finer particles of carbon which with their smaller size and higher surface areas are eliminated first. As the carbon content decreases, the foam index falls more rapidly than expected. It may also be, that the reduction in the adsorptive capacity of the remaining carbon for air adsorbing agents is also affected by the modification through oxidation of the surface of the unburned carbon. Oxidation of the surface causes the formation of carboxylate or carbonyl species on the surface, which increases its polarity (negative). The greater negative charge reduces the affinity of the surface for air entraining agents, which is evidenced by the reduction in the foam index.

The results of Example 1 are presented in Table 2.

TABLE 2

Effects of PCBO on the Carbon, $SO_3$ Content and Foam Index vs Above Bed Temperature ° C. [Pleasants Fly Ash]

| Above Bed Temp. ° C. | Modified Foam Index 0.2% SLS, ml | % Decrease | Carbon Content % | % Decrease | Sulfur Content | % Decrease |
|---|---|---|---|---|---|---|
| Feed | 2.0 |  | 4.05 |  | 0.92 |  |
| 750 | 1.2 | 40 | 3.68 | 9 | 0.44 | 52 |
| 800 | 0.9 | 55 | 3.63 | 10 | 0.40 | 56 |
| 850 | 0.6 | 70 | 3.58 | 11 | 0.37 | 60 |

Approximately 10% of the total carbon in a the fly ash tested is responsible for 60 to 70% of the adsorption capacity exhibited by the fly ash for air entraining agents. This carbon fraction is very fine and also enriched with sulfur. A fly ash with a low affinity for air entraining agents can be consistently produced with the partial carbon burn out (PCBO) process, with a pilot scale fluidized bed reactor.

The sulfur in the unburned carbon originates from two sources;

unburned coal, which tends to be coarse; and from the partially combusted and very fine carbon.

The authors propose that the fine carbon may adsorb and/or react with the $SO_2$ in the hot flue gases, which elevates the level of $SO_3$ in this carbon fraction. It is known that the adsorption capacity of activated carbon can be improved by the addition of sulfur compounds during the activation process. A similar phenomenon may also occur during the combustion of coal.

As the carbon is combusted by the PCBO process of this invention, there is a concomitant reduction in the sulfur content in the form of $SO_3$. There is a non-linear relationship between the $SO_3$ content of the carbon and adsorption capacity.

Interestingly, there are circumstances where fly ash also contains unacceptable amounts of ammonia from air emission control mechanisms. A separate benefit of this invention is the case where the ammonia content in the ash from a $NO_x$ reduction treatment is high. Residual ammonia contamination of 600 ppm or higher can be significantly reduced by heat treatment at lower temperature, with a fluidized bed reactor and rendered benign. By raising the temperature of the ammonia containing fly ash to 450° C. the ammonia is reduced from 600 ppm to less than 40 ppm, well within acceptable limits for commercial use of the fly ash in concrete.

EXAMPLE 2

Fly ashes were treated in an extended run of the pilot scale fluidized bed reactor. These runs consisted of operating the fluidized bed reactor for 18 hour at 830° C. The results of these tests are given in Table 3. They indicate that the PCBO process consistently produces fly ash with low affinity to air entraining agents, as indicated by a low foam index value.

TABLE 3

Extended Run: 18 Hours at 830° C. (1526° F.)
[Pleasants fly ash]

| Sample ID | Modified Foam Index 0.2% SLS, ml | % Decrease | Carbon % Weight % | % Decrease | Comments |
|---|---|---|---|---|---|
| Feed | 2.1 | | 4.05 | | Very slow end point |
| Sample #4 | 0.7 | 67 | 3.40 | 16 | Fast end point |
| Sample #5 | 0.7 | 67 | 3.38 | 16 | Fast end point |
| Sample #6 | 0.7 | 67 | 3.22 | 20 | Fast end point |

Note:
samples #4, #5 and #6 represent last 6 hours of extended run.

What is claimed is:

1. A process for producing a coal ash product having a low adsorption affinity for air entraining agents in concrete from a feed coal ash; comprising
   a partial combustion of a carbon residue of the feed coal ash wherein a fine carbon fraction of said carbon residue that is responsible for adsorption of air entraining agents in concrete is combusted, while leaving a non-combusted carbon fraction of a non-air entrainment agent absorbing carbon in the coal ash product; and
   a recovery of the coal ash product;
   wherein the fine carbon fraction makes up less than 15% by weight of the carbon residue, while being responsible for as much as 75% of the adsorption of the air entraining agents in concrete.

2. The process according to claim 1, wherein the feed coal ash is a Class C fly ash or a Class F fly ash.

3. The process according to claim 1, wherein the feed coal ash is Class F fly ash.

4. The process according to claim 1, wherein the non-combusted carbon fraction is a crystalline or amorphous carbon.

5. A process according to claim 1, wherein a surface oxidation of the crystalline or amorphous carbon reduces its affinity for air entraining agents.

6. The process according to claim 1, wherein the fine carbon fraction is an amorphous carbon.

7. The process according to claim 1, wherein the partial combustion takes place in a reactor comprising
   a) a combustion chamber;
   b) a controlled ignition system to maintain a narrow range of temperature in the reactor and;
   c) a gas flow control means by which residence time of the coal ash in the reactor is varied.

8. The process according to claim 1, wherein the reactor is a solid and gas contactor.

9. The process according to claim 8, wherein the solid and gas contactor is a fluidized bed reactor with a bed selected from the group consisting of a circulating bed, a packed bed, an expanded bed, a catalytic bed, a fixed bed and combinations thereof.

10. The process according to claim 1, wherein the partial combustion of the coal ash is conducted at a temperature between 700 and 900° C.

11. A process according to claim 7, wherein carbon content of the fine fraction is monitored by a foam index method, whose value gives a measure of the adsorption of air entraining agents by the fine carbon fraction.

12. The process according to claim 11, wherein the foam index method is a modified foam index, the modified foam index comprising;
   a) adding 70 ml. of distilled water containing 0.3 ml 25% by weight sodium citrate solution to 5 grams coal ash to form a suspension;
   b) titrating the suspension with a volume of 0.2% weight sodium lauryl sulfate (SLS) solution until a stable foam layer is obtained after shaking vigorously 20 times with each incremental addition of sodium lauryl sulfate;
   the value of the modified foam index is the volume of 0.2% weight sodium lauryl sulfate solution added.

13. The process according to claim 12, where the foam index of a raw coal ash sample is obtained before treatment by the process,
   the raw coal ash sample is treated in the reactor at different temperatures for a specific period of time; the foam index is obtained for the different temperatures; a calibration curve of temperature versus foam index is plotted with the temperature corresponding to the modified foam index of no more than 0.8 ml selected for operation.

14. A process for producing a coal ash product having a low adsorption affinity for air entraining agents in concrete from a feed coal ash;
   comprising a partial combustion of a carbon residue of the feed coal ash wherein a fine carbon fraction of said carbon residue that is responsible for adsorption of air entraining agents in concrete is combusted, while leaving a non-combusted carbon fraction of a non-air entrainment agent absorbing carbon in the coal ash product;
   a recovery of the coal ash product;
   wherein the feed coal ash also contains sulfur, the sulfur in the coal ash product is reduced by as much as 60% weight.

15. The process according to claim 14, wherein the sulfur is present as $SO_3$.

16. The process according to claim 14, wherein the feed coal ash is a Class C fly ash or a Class F fly ash.

17. The process according to claim 14, wherein the feed coal ash is Class F fly ash.

18. The process according to claim 14, wherein the non-combusted carbon fraction is a crystalline or amorphous carbon.

19. The process according to claim 18, wherein a surface oxidation of the crystalline or amorphous carbon reduces its affinity for air entraining agents.

20. The process of claim 14, wherein the fine carbon fraction is an amorphous carbon.

21. The process according to claim 14, wherein the partial combustion takes place in a reactor comprising
   a) a combustion chamber;
   b) a controlled ignition system to maintain a narrow range of temperature in the reactor and;
   c) a gas flow control means by which residence time of the coal ash in the reactor is varied.

22. The process according to claim 21, wherein the reactor is a solid and gas contactor.

23. The process according to claim 22, wherein the solid and gas contactor is a fluidized bed reactor with a bed selected from the group consisting of a circulating bed, a packed bed, an expanded bed, a catalytic bed, a fixed bed and combinations thereof.

24. The process according to claim 14, wherein the partial combustion of the coal ash is conducted at a temperature between 700 and 900° C.

25. A process for producing a coal ash product having a low adsorption affinity for air entraining agents in concrete from a feed coal ash;

comprising a partial combustion of a carbon residue of the feed coal ash wherein a fine carbon fraction of said carbon residue that is responsible for adsorption of air entraining agents in concrete is combusted, while leaving a non-combusted carbon fraction of a non-air entrainment agent absorbing carbon in the coal ash product;

a recovery of the coal ash product;

wherein the feed coal ash also contains ammonia, and ammonia in the coal ash product is reduced by as much as 80% weight.

26. The process according to claim 25, wherein the feed coal ash is a Class C fly ash or a Class F fly ash.

27. The process according to claim 25, wherein the feed coal ash is Class F fly ash.

28. The process according to claim 25, wherein the non-combusted carbon fraction is a crystalline or amorphous carbon.

29. The process according to claim 28, wherein a surface oxidation of the crystalline or amorphous carbon reduces its affinity for air entraining agents.

30. The process of claim 25, wherein the fine carbon fraction is an amorphous carbon.

31. The process according to claim 25, wherein the partial combustion takes place in a reactor comprising a) a combustion chamber;

b) a controlled ignition system to maintain a narrow range of temperature in the reactor and;

c) a gas flow control means by which residence time of the coal ash in the reactor is varied.

32. The process according to claim 31, wherein the reactor is a solid and gas contactor.

33. The process according to claim 32, wherein the solid and gas contactor is a fluidized bed reactor with a bed selected from the group consisting of a circulating bed, a packed bed, an expanded bed, a catalytic bed, a fixed bed and combinations thereof.

34. The process according to claim 25, wherein the partial combustion of the coal ash is conducted at a temperature between 700 and 900° C.

35. A method for reducing the adsorption characteristics of a coal ash bearing a carbon residue, said coal ash obtained from the combustion of coal;

comprising combusting an adsorbing fraction of said carbon residue responsible for adsorption of air entraining agents in concrete, while leaving non-adsorbing carbon of said carbon residue un-combusted with said coal ash;

wherein the fine carbon fraction makes up less than 15% by weight of the carbon residue, while being responsible for as much as 75% of the adsorption of the air entraining agents in concrete.

* * * * *